United States Patent
Simpson et al.

(10) Patent No.: US 12,454,975 B2
(45) Date of Patent: Oct. 28, 2025

(54) BLIND FASTENERS WITH EME PROTECTION AND SEALING

(71) Applicant: The Boeing Company, Arlington, VA (US)

(72) Inventors: Blake Simpson, Kent, WA (US); Sean Dennis Morden, Federal Way, WA (US)

(73) Assignee: The Boeing Company, Arlington, VA (US)

( * ) Notice: Subject to any disclaimer, the term of this patent is extended or adjusted under 35 U.S.C. 154(b) by 440 days.

(21) Appl. No.: 18/182,324

(22) Filed: Mar. 11, 2023

(65) Prior Publication Data

US 2024/0301905 A1    Sep. 12, 2024

(51) Int. Cl.
*F16B 19/00* (2006.01)
*F16B 19/10* (2006.01)
*F16B 19/04* (2006.01)

(52) U.S. Cl.
CPC ........ *F16B 19/008* (2013.01); *F16B 19/1054* (2013.01); *F16B 2019/045* (2013.01)

(58) Field of Classification Search
None
See application file for complete search history.

(56) References Cited

U.S. PATENT DOCUMENTS 9,802,715 B2   10/2017   Whitlock et al.
10,774,863 B2   9/2020   Simpson et al.

*Primary Examiner* — James C Yager
(74) *Attorney, Agent, or Firm* — Yee & Associates, P.C.

(57) ABSTRACT

Methods and blind fasteners with EME protection are provided. A blind fastener comprises a shank having a bulb forming portion; a head; and an electromagnetic effects (EME) protection sealant positioned on at least one of the bulb forming portion of the shank or under the head.

25 Claims, 12 Drawing Sheets

BLIND FASTENERS WITH EME PROTECTION AND SEALING

BACKGROUND INFORMATION

1. Field

The present disclosure relates generally to composite manufacturing and more particularly to fastening composite materials with blind fasteners.

2. Background

Currently a fastener in a composite structure can be sealed by applying a dollop of sealant to at least one of a head or a bulb of the fastener. Applying dollops of sealant can use an undesirable amount of sealant. With blind fasteners or constrained spaces, a backside of the fastener may not be accessible for sealant application.

Therefore, it would be desirable to have a method and apparatus that takes into account at least some of the issues discussed above, as well as other possible issues.

SUMMARY

An embodiment of the present disclosure provides a blind fastener. The blind fastener comprises a shank having a bulb forming portion, a head, and an electromagnetic effects (EME) protection sealant positioned on at least one of the bulb forming portion of the shank or under the head.

Another embodiment of the present disclosure provides a method of providing electromagnetic effects protection to a composite structure. An electromagnetic effects (EME) protection sealant is applied to a number of portions of a blind fastener. The blind fastener with the electromagnetic effects (EME) protection sealant is installed into the composite structure such that the electromagnetic effects (EME) protection sealant is between the number of portions of the blind fastener and the composite structure.

A further embodiment of the present disclosure provides a composite structure. The composite structure comprises a first composite component, a second composite component, a blind fastener installed through a hole in the first composite component and the second composite component, and an electromagnetic effects (EME) protection sealant positioned at least one of between a bulb of the blind fastener and the second composite component or between a head of the blind fastener and the first composite component.

A further embodiment of the present disclosure provides a method of forming a liquid-tight seal during blind fastener installation. A blind fastener with electromagnetic effects (EME) protection sealant on a number of portions of the blind fastener is inserted through a hole of a composite structure. The blind fastener is installed such that the electromagnetic effects (EME) protection sealant is secured between the blind fastener and the composite structure to seal at least one side of the hole of the composite structure.

A yet further embodiment of the present disclosure provides a method of forming an alloy seal during blind fastener installation. A malleable alloy is located between a number of portions of a blind fastener and a composite structure. The malleable alloy is friction formed into a seal during blind fastener installation.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
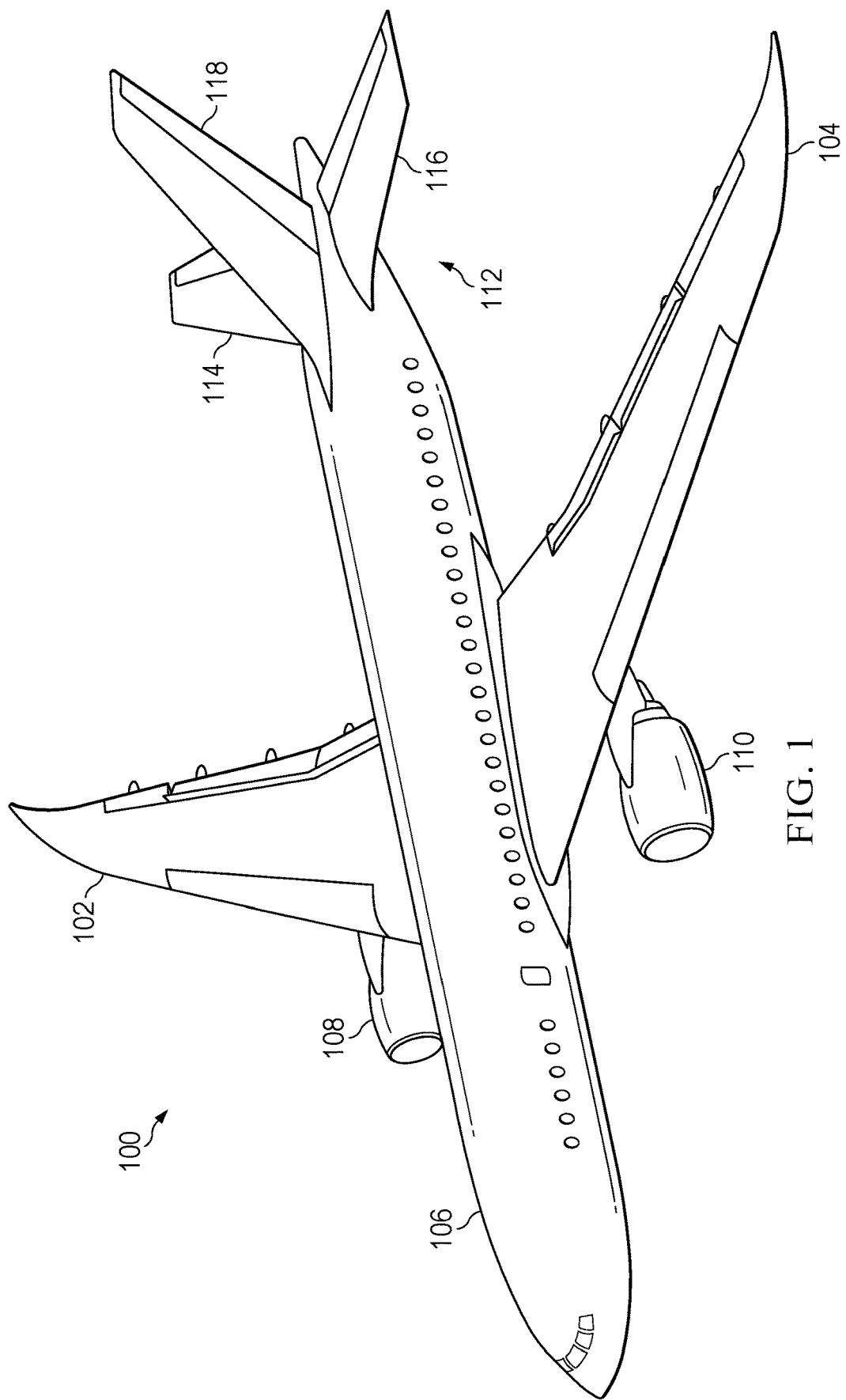
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft that can have EME protection provided by the illustrative examples. Aircraft 100 is an example of a platform manufactured with blind fasteners having electromagnetic effects (EME) protection sealant. Blind fasteners with electromagnetic effects (EME) protection sealant can be used to form at least one of wing 102, wing 104, or body 106.

Figure 2:
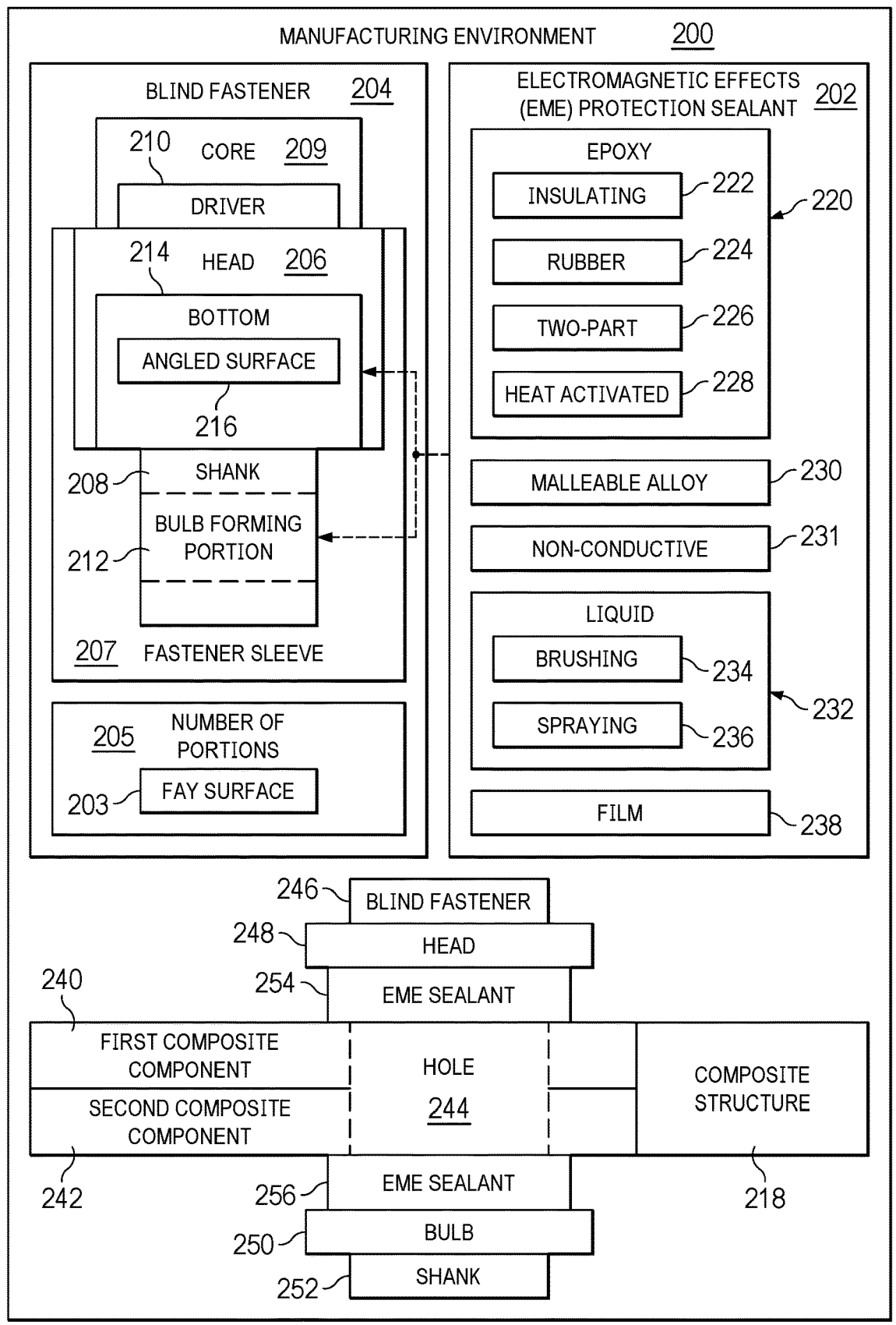
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. In manufacturing environment 200, blind fastener 204 with electromagnetic effects (EME) protection sealant 202 can be used to join components. Blind fastener 204 comprises head 206, shank 208, and driver 210. Shank 208 has bulb forming portion 212. When driver 210 is moved towards head 206, bulb forming portion 212 of shank 208 is compressed to form a bulb. Bulb forming portion 212 may also be referred to as a malleable portion of shank 208. In these illustrative examples, the malleable portion of shank 208 is a portion of the shank 208 configured to form a bulb during installation Head 206 has bottom 214. In some illustrative examples, bottom 214 of head 206 has angled surface 216. Angled surface 216 can be countersunk into a composite structure, such as composite structure 218. In these illustrative examples, blind fastener 204 is a countersunk fastener and angled surface 216 of head 206 is a countersink of head 206.

Blind fastener 204 further comprises electromagnetic effects (EME) protection sealant 202 applied to blind fastener 204. electromagnetic effects (EME) protection sealant 202 is a material configured to seal blind fastener 204 to a structure and provide both fluid sealing and electromagnetic effect (EME) protection.

electromagnetic effects (EME) protection sealant 202 is applied to number of portions 205 of blind fastener 204. Number of portions 205 comprises fay surface 203. Fay surface 203 is any surface that will be in contact with composite structure 218 when installed in composite structure 218. In some illustrative examples, fay surface 203 is one of bulb forming portion 212 of shank 208 or bottom 214 of head 206.

electromagnetic effects (EME) protection sealant 202 is positioned on at least one of bulb forming portion 212 of shank 208 or under head 206 on angled surface 216. electromagnetic effects (EME) protection sealant 202 is selected from any desirable material to provide a fluid tight seal. electromagnetic effects (EME) protection sealant 202 is selected from any desirable material that is non-reactive to material of blind fastener 204 and material of composite structure 218.

In some illustrative examples, electromagnetic effects (EME) protection sealant 202 comprises epoxy 220. In some illustrative examples, electromagnetic effects (EME) protection sealant 202 comprises insulating 222 epoxy 220. In some illustrative examples, insulating 222 epoxy 220 comprises a rubber 224.

In some illustrative examples, electromagnetic effects (EME) protection sealant 202 comprises a two-part 226 epoxy 220. In some illustrative examples, the electromagnetic effects (EME) protection sealant 202 is heat activated 228. In some illustrative examples, electromagnetic effects (EME) protection sealant (202) is friction activated between blind fastener (204) and composite structure (218) during installation of blind fastener (204).

In some illustrative examples, two-part 226 epoxy 220 is heat activated 228 by friction during installation of blind fastener 204. In some illustrative examples, when electromagnetic effects (EME) protection sealant 202 is heat activated 228, friction between blind fastener 204 and composite structure 218 during installation in composite structure 218 is sufficient to activate electromagnetic effects (EME) protection sealant 202. In some illustrative examples, additional heat is applied by a heater or other external heat generator to activate heat activated 228 epoxy 220.

In some illustrative examples, two-part 226 epoxy 220 is applied in a two-step process. In some illustrative examples, an "A part" of two-part 226 epoxy 220 is applied and allowed to dry. Afterwards, a "B part" of two-part 226 epoxy 220 is applied over the dried "A part" and allowed to dry. The A part and B part of two-part 226 epoxy 220 can be activated by heat under the countersink of head 206 by turning of fastener sleeve 207 comprising head 206 and shank 208 during installation, by the turning of core 209 comprising driver 210 under fastener sleeve 207, and the deformation of shank 208 of fastener sleeve 207.

In some illustrative examples, electromagnetic effects (EME) protection sealant 202 comprises malleable alloy 230. In some illustrative examples, electromagnetic effects (EME) protection sealant 202 is non-conductive 231. In some illustrative examples, when blind fastener 204 is installed, malleable alloy 230 is friction formed into a seal.

In some illustrative examples, electromagnetic effects (EME) protection sealant 202 is film 238. In some illustrative examples, the electromagnetic effects (EME) protection sealant 202 is liquid 232. In some illustrative examples, liquid 232 electromagnetic effects (EME) protection sealant 202 is applied to blind fastener 204 by brushing 234. In some illustrative examples, liquid 232 electromagnetic effects (EME) protection sealant 202 is applied to blind fastener 204 by spraying 236. In some illustrative examples, electromagnetic effects (EME) protection sealant 202 can be a slurry or a paste. In some illustrative examples, a slurry or a paste can be applied by brushing 234.

Blind fasteners can be used to form a joint in composite structure 218. Blind fasteners, such as blind fastener 204, can be used to join first composite component 240 and second composite component 242. As depicted, blind fastener 246 has already been installed in composite structure 218. In some illustrative examples, blind fastener 204 and blind fastener 246 have the same design.

Blind fastener 246 had electromagnetic effects (EME) protection sealant 202 applied to at least one of shank 252 or head 248 prior to installation in composite structure 218. As depicted, blind fastener 246 has electromagnetic effects (EME) protection sealant 254 between head 248 of blind fastener 246 and composite structure 218. Additionally, blind fastener 246 has electromagnetic effects (EME) protection sealant 256 between bulb 250 and composite structure 218. electromagnetic effects (EME) protection sealant 254 and electromagnetic effects (EME) protection sealant 256 are portions of electromagnetic effects (EME) protection sealant 202 applied to blind fastener 246. electromagnetic effects (EME) protection sealant 254 and electromagnetic effects (EME) protection sealant 256 can take any desirable form of electromagnetic effects (EME) protection sealant 202. In some illustrative examples, electromagnetic effects (EME) protection sealant 254 and electromagnetic effects (EME) protection sealant 256 are the same material.

In some illustrative examples, electromagnetic effects (EME) protection sealant 254 and electromagnetic effects (EME) protection sealant 256 are different materials.

In this illustrative example, blind fastener 246 is sealed against fluid leakage in two locations. The seal on both ends, provided by electromagnetic effects (EME) protection sealant 254 and electromagnetic effects (EME) protection sealant 256, can prevent expanded gases produced by a lightning strike from escaping from either end until the area cools down. The seal on both ends, provided by electromagnetic effects (EME) protection sealant 254 and electromagnetic effects (EME) protection sealant 256, can reduce or prevent fluid leakage through hole 244 or blind fastener 246.

electromagnetic effects (EME) protection sealant 202 provides two functionalities to blind fastener 204. electromagnetic effects (EME) protection sealant 202 provides two functionalities when installed in composite structure. electromagnetic effects (EME) protection sealant 202 provides both fluid tightness and protection against electromagnetic effects (EME). Using electromagnetic effects (EME) protection sealant 254 and electromagnetic effects (EME) protection sealant 256, hole 244 and blind fastener 246 fully seal, preventing fluid from entering.

electromagnetic effects (EME) protection sealant 202 provides protection against electromagnetic effects (EME). The energy from a lightning strike or electrical current dissipation is sufficient with electromagnetic effects (EME) protection sealant 202 provided such that blind fasteners with electromagnetic effects (EME) protection sealant 202 do not utilize additional parts attached for EME protection.

electromagnetic effects (EME) protection sealant 202 provides sealing against liquids. In some illustrative examples, electromagnetic effects (EME) protection sealant (202) is configured to seal against aircraft fuel.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, electromagnetic effects (EME) protection sealant 202 may not be present at both bulb 250 and head 248. Although only blind fastener 246 is shown in composite structure 218, any desirable quantity of fasteners can be present to form a joint.

Figure 3:
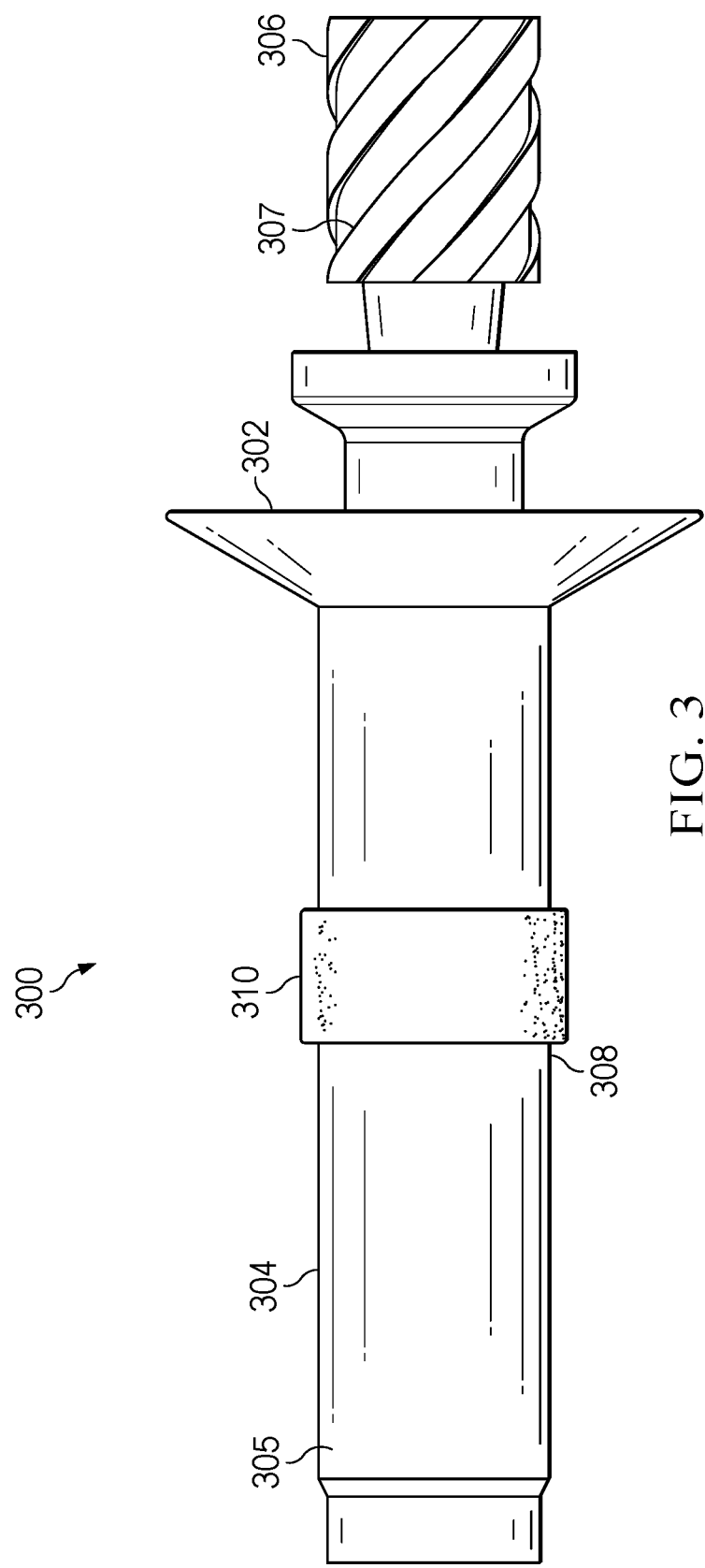
FIG. 3 is an illustration of a side view of a blind fastener with a layer of electromagnetic effects (EME) protection sealant on a portion of the shank in accordance with an illustrative embodiment.

Turning now to FIG. 3, an illustration of a side view of a blind fastener with a layer of electromagnetic effects (EME) protection sealant on a portion of the shank is depicted in accordance with an illustrative embodiment. Blind fastener 300 is a physical implementation of blind fastener 204 of FIG. 2. Blind fastener 300 comprises head 302, shank 304, and driver 306. Shank 304 is a portion of blind fastener 300 between head 302 and the end of blind fastener 300. Driver 306 is a portion of core 307. In moving driver 306 towards head 302, core 307 engages threads (not visible) inside of sleeve 305. As core 307 engages the threads (not visible) inside of sleeve 305, sleeve 305 is shortened and crushed.

Sleeve 305 has head 302 and shank 304. Sleeve 305 has bulb forming portion 308. Bulb forming portion 308 of sleeve 305 is a portion that will be crushed together to form a bulb when blind fastener 300 is installed. Driving driver 306 towards shank 304 will pull a portion of sleeve 305 towards head 302 to crush bulb forming portion 308 to create a bulb.

In this illustrative example, electromagnetic effects (EME) protection sealant 310 has been applied to bulb forming portion 308. electromagnetic effects (EME) protection sealant 310 can be applied in any desirable fashion. In some illustrative examples, electromagnetic effects (EME) protection sealant 310 can be applied by as a film. In some illustrative examples, electromagnetic effects (EME) protection sealant 310 can be applied by brushing on a paste or a liquid. In some illustrative examples, electromagnetic effects (EME) protection sealant 310 can be applied by spraying on a liquid.

electromagnetic effects (EME) protection sealant 310 is selected from any desirable materials. The material of electromagnetic effects (EME) protection sealant 310 selected to be non-reactive with the material of blind fastener 300 and a composite material of a composite structure to receive blind fastener 300. In some illustrative examples, the material of electromagnetic effects (EME) protection sealant 310 is configured to be non-conductive. In some illustrative examples, the material of electromagnetic effects (EME) protection sealant 310 is configured to form a fluid seal.

In some illustrative examples, electromagnetic effects (EME) protection sealant 310 is an epoxy material. In some illustrative examples, electromagnetic effects (EME) protection sealant 310 is a two-part epoxy material. In some illustrative examples, electromagnetic effects (EME) protection sealant 310 is a heat activated epoxy. In some illustrative examples, electromagnetic effects (EME) protection sealant 310 is a rubber epoxy. In some illustrative examples, electromagnetic effects (EME) protection sealant 310 is a malleable alloy.

A remainder of shank 304 of blind fastener 300 is free of electromagnetic effects (EME) protection sealant 310. As depicted, at least a portion of shank 304 is not covered by electromagnetic effects (EME) protection sealant 310. By providing an uncovered portion of shank 304, it allows a structure material to pass electrical currents through the fastener system, blind fastener 300.

Figure 4:
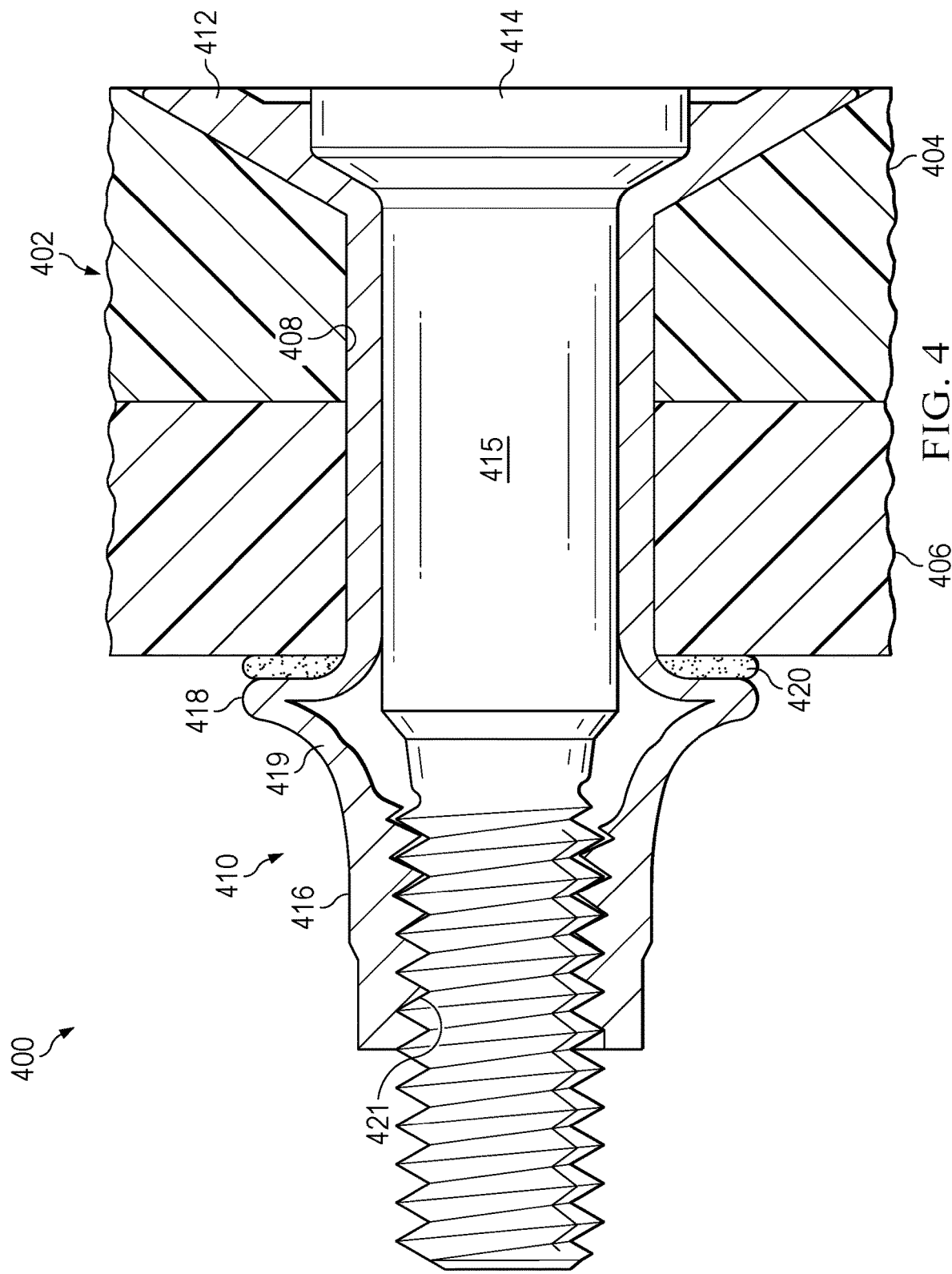
FIG. 4 is an illustration of a cross-sectional view of a blind fastener installed in a composite structure such that the electromagnetic effects (EME) protection sealant is between the bulb and the composite structure in accordance with an illustrative embodiment.

Turning now to FIG. 4, an illustration of a cross-sectional view of a blind fastener installed in a composite structure such that the electromagnetic effects (EME) protection sealant is between the bulb and the composite structure is depicted in accordance with an illustrative embodiment. View 400 is a cross-sectional view through composite structure 402 with blind fastener 410 installed. Composite structure 402 comprises first composite component 404 and second composite component 406. Hole 408 extends through first composite component 404 and second composite component 406.

Blind fastener 410 is installed in hole 408. Blind fastener 410 comprises head 412, driver 414, and shank 416. Shank 416 is a portion of blind fastener 410 between head 412 and the end of blind fastener 410. Driver 414 is a portion of core 415. In moving driver 414 towards head 412, core 415 engaged threads 421 inside of sleeve 419. As core 415 engaged threads 421 inside of sleeve 419, sleeve 419 was shortened and crushed.

Sleeve 419 has head 412 and shank 416. In this illustrative example, sleeve 419 has formed bulb 418 during installation. electromagnetic effects (EME) protection sealant 420 is pressed between bulb 418 of blind fastener 410 and composite structure 402. electromagnetic effects (EME) protection sealant 420 is a sealant that was initially present on a bulb forming portion of sleeve 419. In some illustrative examples, electromagnetic effects (EME) protection sealant 420 can be the same as electromagnetic effects (EME) protection sealant 310 of FIG. 3.

electromagnetic effects (EME) protection sealant 420 provides a fluid tight seal between composite structure 402 and blind fastener 410. Providing a seal between composite structure 402 and blind fastener 410 provides electromagnetic effects (EME) protection.

Sealing composite structure 402 and blind fastener 410 using electromagnetic effects (EME) protection sealant 420 prevents sparks from getting out of the joint. Sealing composite structure 402 and blind fastener 410 using electromagnetic effects (EME) protection sealant 420 prevents fluid from entering composite structure 402 and accessing fibers in composite structure 402.

Figure 5:
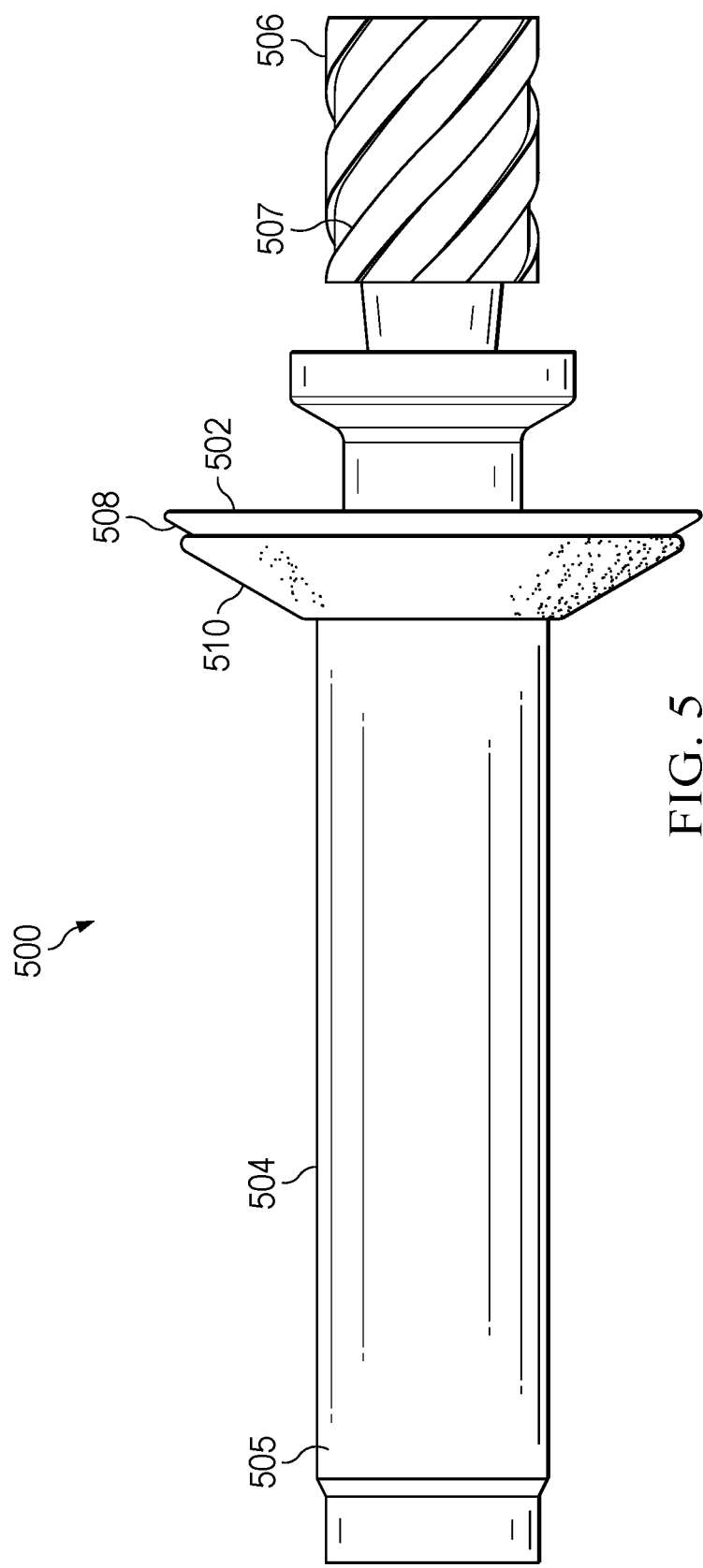
FIG. 5 is an illustration of a side view of a blind fastener with a layer of electromagnetic effects (EME) protection sealant under the head in accordance with an illustrative embodiment.

Turning now to FIG. 5, an illustration of a side view of a blind fastener with a layer of electromagnetic effects (EME) protection sealant under the head is depicted in accordance with an illustrative embodiment. Blind fastener 500 is a physical implementation of blind fastener 204 of FIG. 2. Blind fastener 500 comprises head 502, shank 504, and driver 506.

Shank 504 is a portion of blind fastener 500 between head 502 and the end of blind fastener 500. Driver 506 is a portion of core 507. In moving driver 506 towards head 502, core 507 engages threads (not visible) inside of sleeve 505. As core 507 engages the threads (not visible) inside of sleeve 505, sleeve 505 is shortened and crushed.

Sleeve 505 has head 502 and shank 504. Head 502 has angled surface 508 as an underside of head 502. In this illustrative example, electromagnetic effects (EME) protection sealant 510 has been applied under head 502 to angled surface 508.

electromagnetic effects (EME) protection sealant 510 can be applied in any desirable fashion. In some illustrative examples, electromagnetic effects (EME) protection sealant 510 can be applied by as a film. In some illustrative examples, electromagnetic effects (EME) protection sealant 510 can be applied by brushing on a paste or a liquid. In some illustrative examples, electromagnetic effects (EME) protection sealant 510 can be applied by spraying on a liquid.

electromagnetic effects (EME) protection sealant 510 is selected from any desirable materials. The material of electromagnetic effects (EME) protection sealant 510 selected to be non-reactive with the material of blind fastener 500 and a composite material of a composite structure to receive blind fastener 500. In some illustrative examples, the material of electromagnetic effects (EME) protection sealant 510 is configured to be non-conductive. In some illustrative examples, the material of electromagnetic effects (EME) protection sealant 510 is configured to form a fluid seal.

In some illustrative examples, electromagnetic effects (EME) protection sealant 510 is an epoxy material. In some illustrative examples, electromagnetic effects (EME) protection sealant 510 is a two-part epoxy material. In some illustrative examples, electromagnetic effects (EME) protection sealant 510 is a heat activated epoxy. In some illustrative examples, electromagnetic effects (EME) protection sealant 510 is a rubber epoxy. In some illustrative examples, electromagnetic effects (EME) protection sealant 510 is a malleable alloy.

Figure 6:
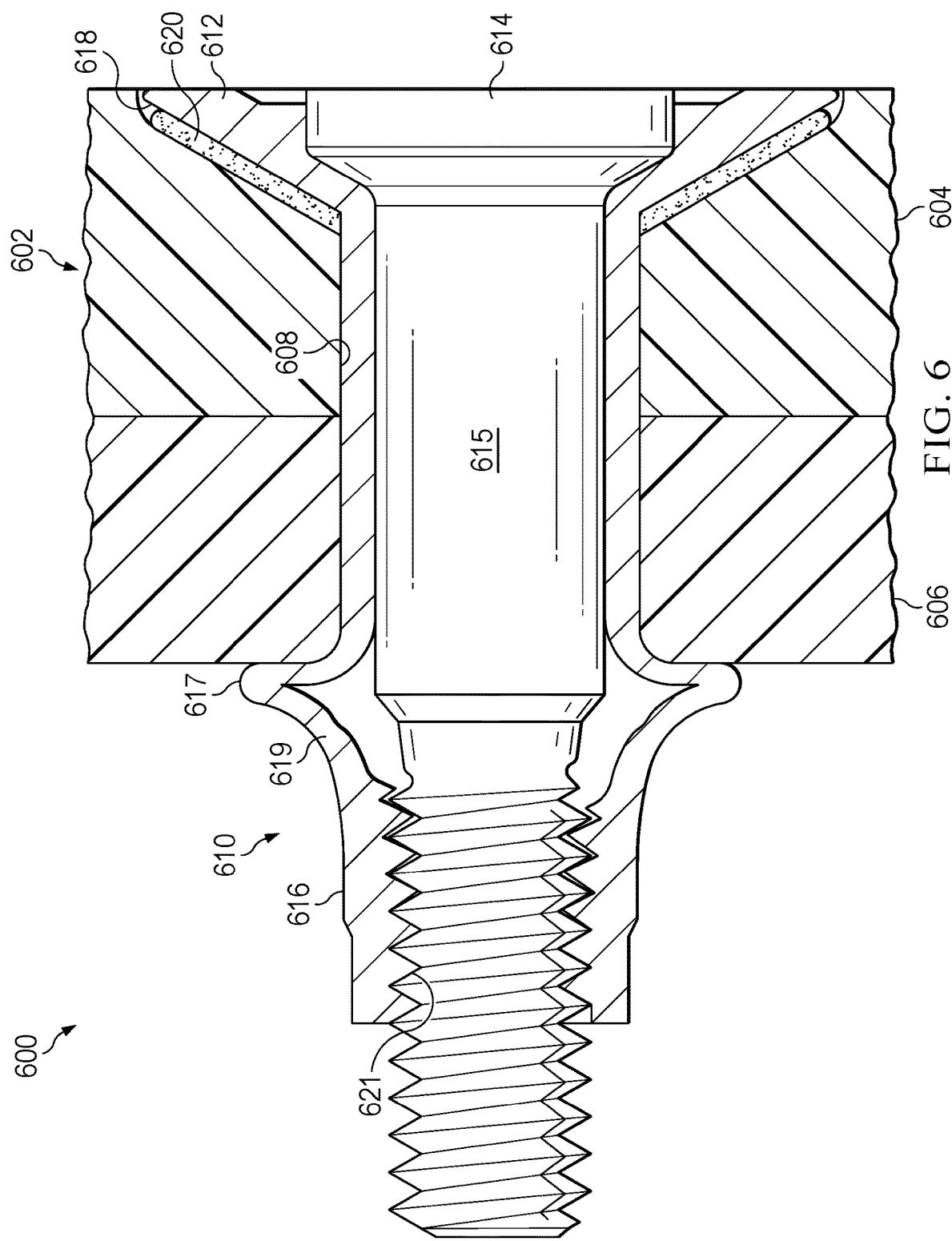
FIG. 6 is an illustration of a cross-sectional view of a blind fastener installed in a composite structure such that the electromagnetic effects (EME) protection sealant is between the head and the composite structure in accordance with an illustrative embodiment.

Turning now to FIG. 6, an illustration of a cross-sectional view of a blind fastener installed in a composite structure such that the electromagnetic effects (EME) protection sealant is between the head and the composite structure is depicted in accordance with an illustrative embodiment. View 600 is a cross-sectional view through composite structure 602 with blind fastener 610 installed. Composite structure 602 comprises first composite component 604 and second composite component 606. Hole 608 extends through first composite component 604 and second composite component 606.

Blind fastener 610 is installed in hole 608. Blind fastener 610 comprises head 612, driver 614, and shank 616. Shank 616 is a portion of blind fastener 610 between head 612 and the end of blind fastener 610. Driver 614 is a portion of core 615. In moving driver 614 towards head 612, core 615 engaged threads 621 inside of sleeve 619. As core 615 engaged threads 621 inside of sleeve 619, sleeve 619 was shortened and crushed. In this illustrative example, sleeve 619 has formed bulb 617 during installation. Sleeve 619 has head 612 and shank 616.

electromagnetic effects (EME) protection sealant 620 is pressed between head 612 of blind fastener 610 and composite structure 602. electromagnetic effects (EME) protection sealant 620 is a sealant that was initially present on angled surface 618 of head 612 of blind fastener 610. In some illustrative examples, electromagnetic effects (EME) protection sealant 620 can be the same as electromagnetic effects (EME) protection sealant 510 of FIG. 5.

electromagnetic effects (EME) protection sealant 620 provides a fluid tight seal between composite structure 602 and blind fastener 610. Providing a seal between composite structure 602 and blind fastener 610 provides electromagnetic effects (EME) protection.

Sealing composite structure 602 and blind fastener 610 using electromagnetic effects (EME) protection sealant 620 prevents sparks from getting out of the joint. Sealing composite structure 602 and blind fastener 610 using electromagnetic effects (EME) protection sealant 620 prevents fluid from entering composite structure 602 and accessing fibers in composite structure 602.

Figure 7:
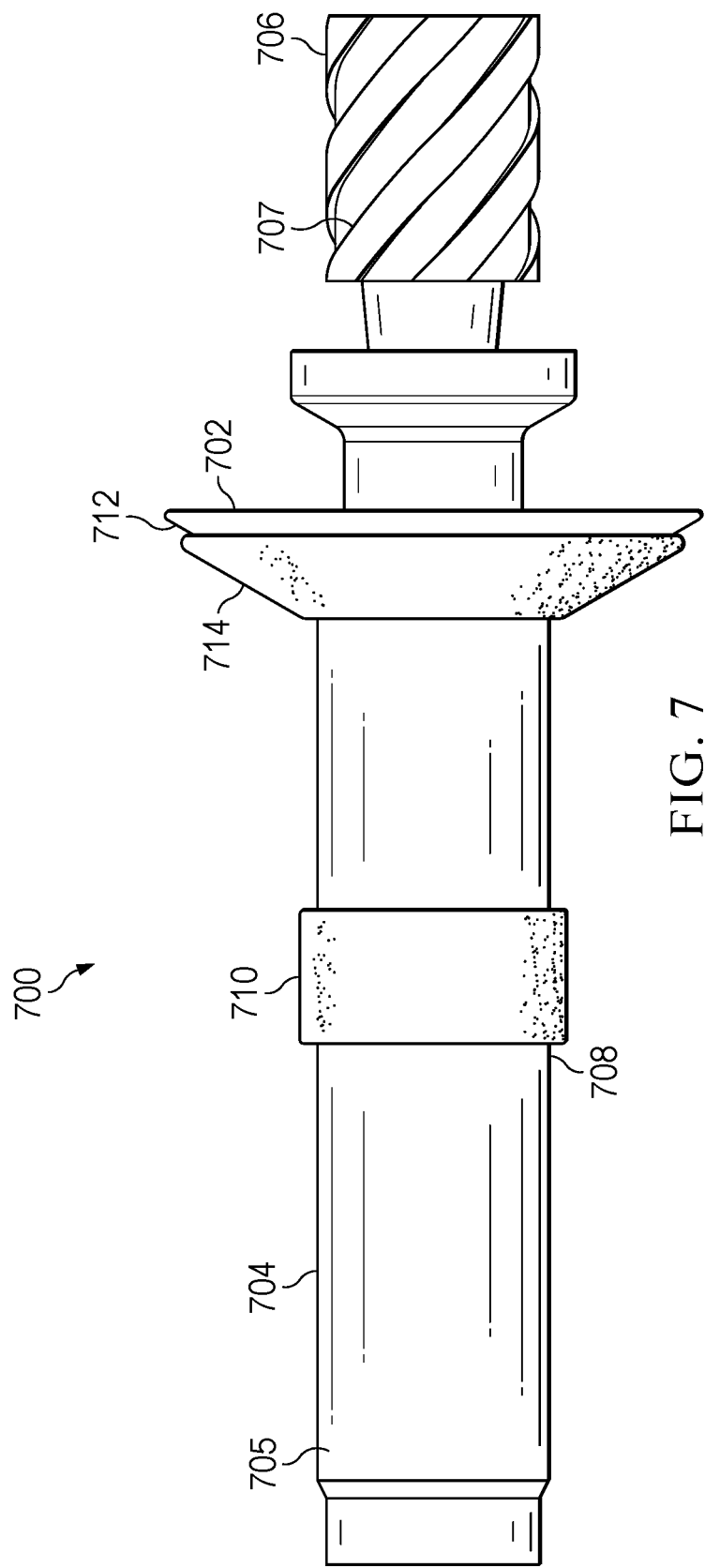
FIG. 7 is an illustration of a side view of a blind fastener with a layer of electromagnetic effects (EME) protection sealant on a portion of the shank and under the head in accordance with an illustrative embodiment.

Turning now to FIG. 7, an illustration of a side view of a blind fastener with a layer of electromagnetic effects (EME) protection sealant on a portion of the shank and under the head is depicted in accordance with an illustrative embodiment. Blind fastener 700 is a physical implementation of blind fastener 204 of FIG. 2. Blind fastener 700 comprises head 702, shank 704, and driver 706.

Shank 704 is a portion of blind fastener 700 between head 702 and the end of blind fastener 700. Driver 706 is a portion of core 707. In moving driver 706 towards head 702, core 707 engages threads (not visible) inside of sleeve 705. As core 707 engages the threads (not visible) inside of sleeve 705, sleeve 705 is shortened and crushed.

Sleeve 705 has head 702 and shank 704. Sleeve 705 has head 702 and shank 704. Sleeve 705 has bulb forming portion 708. Bulb forming portion 708 of sleeve 705 is a portion that will be crushed together to form a bulb when blind fastener 700 is installed. Driving driver 706 towards shank 704 will pull a portion of sleeve 705 towards head 702 to crush bulb forming portion 708 to create a bulb. In this illustrative example, electromagnetic effects (EME) protection sealant 710 has been applied to bulb forming portion 708.

Head 702 has angled surface 712 as an underside of head 702. In this illustrative example, electromagnetic effects (EME) protection sealant 714 has been applied under head 702 to angled surface 712. electromagnetic effects (EME) protection sealant 710 and electromagnetic effects (EME) protection sealant 714 can be applied in any desirable fashion, such as by brushing, spraying, or as a film.

electromagnetic effects (EME) protection sealant 710 and electromagnetic effects (EME) protection sealant 714 are selected from any desirable materials, as described above with respect to FIGS. 2, 3, and 5. In some illustrative examples, electromagnetic effects (EME) protection sealant 710 and electromagnetic effects (EME) protection sealant 714 are a same EME sealing material. In other illustrative examples, electromagnetic effects (EME) protection sealant 710 and electromagnetic effects (EME) protection sealant 714 are different EME sealing materials.

Figure 8:
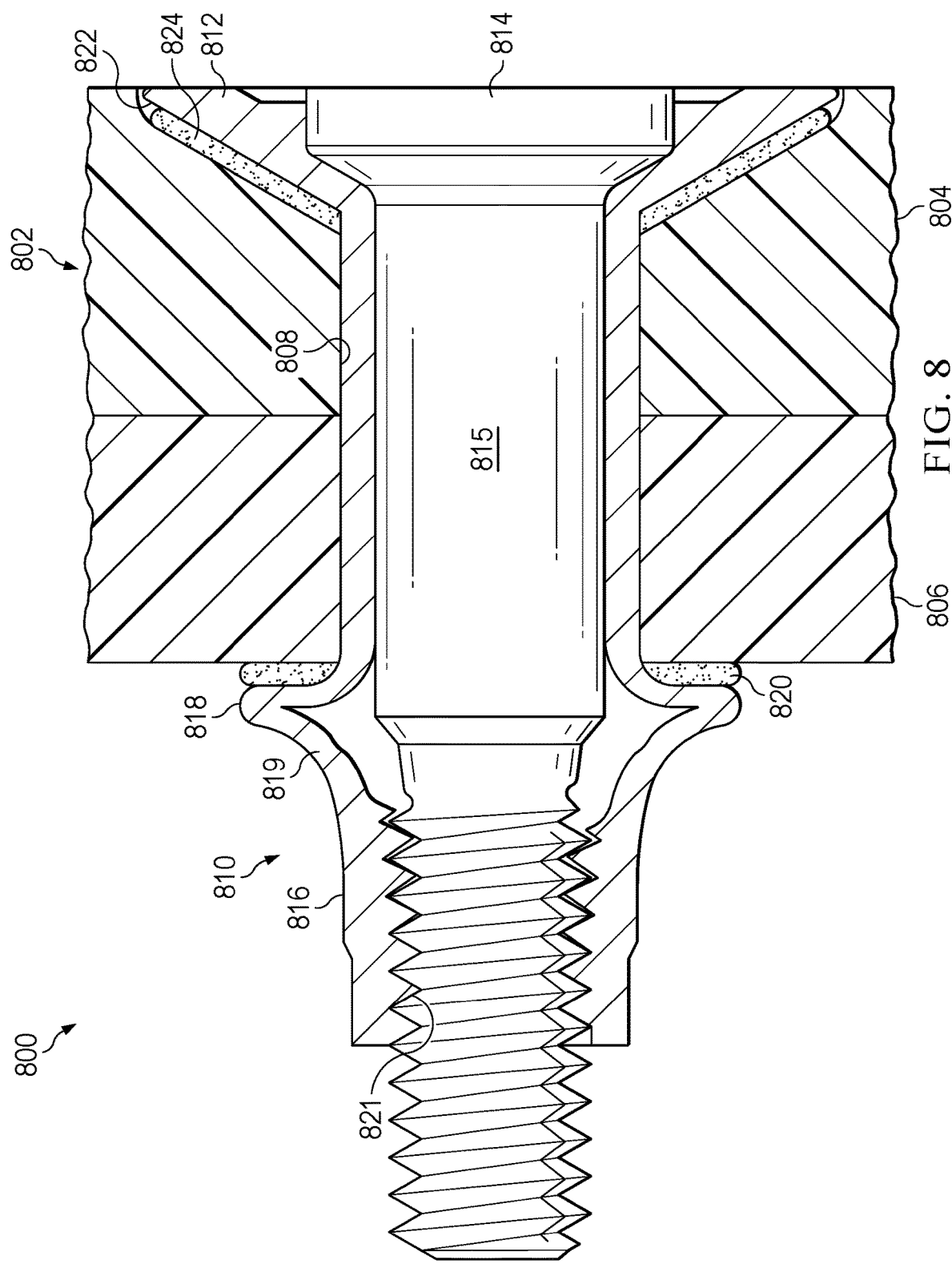
FIG. 8 is an illustration of a cross-sectional view of a blind fastener installed in a composite structure such that the electromagnetic effects (EME) protection sealant is between the composite structure and both the bulb and the head in accordance with an illustrative embodiment.

Turning now to FIG. 8, an illustration of a cross-sectional view of a blind fastener installed in a composite structure such that the electromagnetic effects (EME) protection sealant is between the composite structure and both the bulb and the head is depicted in accordance with an illustrative embodiment. View 800 is a cross-sectional view through composite structure 802 with blind fastener 810 installed. Composite structure 802 comprises first composite component 804 and second composite component 806. Hole 808 extends through first composite component 804 and second composite component 806.

Blind fastener 810 is installed in hole 808. Blind fastener 810 comprises head 812, driver 814, and shank 816. Shank 816 is a portion of blind fastener 810 between head 812 and the end of blind fastener 810. Driver 814 is a portion of core 815. In moving driver 814 towards head 812, core 815 engaged threads 821 inside of sleeve 819. As core 815 engaged threads 821 inside of sleeve 819, sleeve 819 was shortened and crushed. Sleeve 819 has head 812 and shank 816. In this illustrative example, sleeve 819 has formed bulb 818 during installation.

electromagnetic effects (EME) protection sealant 820 is pressed between bulb 818 of blind fastener 810 and composite structure 802. electromagnetic effects (EME) protection sealant 820 is a sealant that was initially present on a bulb forming portion of sleeve 819. In some illustrative examples, electromagnetic effects (EME) protection sealant 820 can be the same as electromagnetic effects (EME) protection sealant 710 of FIG. 7.

electromagnetic effects (EME) protection sealant 824 is pressed between head 812 of blind fastener 810 and composite structure 802. electromagnetic effects (EME) protection sealant 824 is a sealant that was initially present on angled surface 822 of head 812 of blind fastener 810. In some illustrative examples, electromagnetic effects (EME) protection sealant 824 can be the same as electromagnetic effects (EME) protection sealant 714 of FIG. 7.

electromagnetic effects (EME) protection sealant 820 and electromagnetic effects (EME) protection sealant 824 provides fluid tight seals between composite structure 802 and blind fastener 810. Providing seals between composite structure 802 and blind fastener 810 provides electromagnetic effects (EME) protection.

Sealing composite structure 802 and blind fastener 810 using electromagnetic effects (EME) protection sealant 820 and electromagnetic effects (EME) protection sealant 824 prevents sparks from getting out of the joint. Sealing composite structure 802 and blind fastener 810 using electromagnetic effects (EME) protection sealant 820 and electromagnetic effects (EME) protection sealant 824 prevents fluid from entering composite structure 802 and accessing fibers in composite structure 802.

Figure 9:
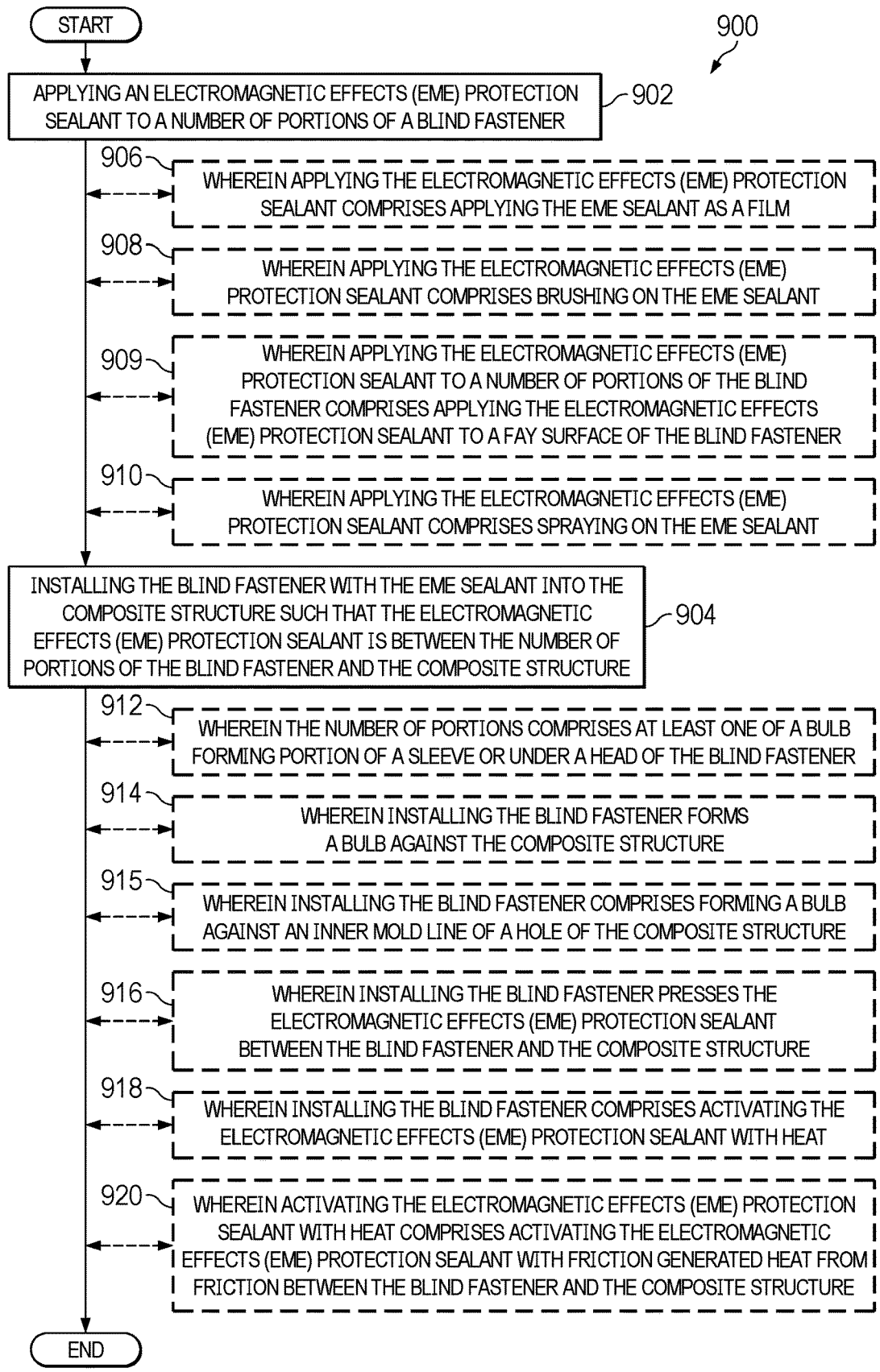
FIG. 9 is a flowchart of a method of providing electromagnetic effects protection to a composite structure in accordance with an illustrative embodiment.

Turning now to FIG. 9, a flowchart of a method of providing electromagnetic effects protection to a composite structure is depicted in accordance with an illustrative embodiment. Method 900 can be used to apply electromagnetic effects (EME) protection sealant 310 to blind fastener 300. Method 900 can be used to install blind fastener 410 in composite structure 402. Method 900 can be used to apply electromagnetic effects (EME) protection sealant 510 to blind fastener 500. Method 900 can be used to install blind fastener 610 in composite structure 602. Method 900 can be used to apply electromagnetic effects (EME) protection sealant 710 and electromagnetic effects (EME) protection sealant 714 to blind fastener 700. Method 900 can be used to install blind fastener 810 in composite structure 802.

Method 900 applies an electromagnetic effects (EME) protection sealant to a number of portions of a blind fastener (operation 902). Method 900 installs the blind fastener with the electromagnetic effects (EME) protection sealant into the composite structure such that the electromagnetic effects (EME) protection sealant is between the number of portions of the blind fastener and the composite structure (operation 904). Afterwards, method 900 terminates.

In some illustrative examples, applying the electromagnetic effects (EME) protection sealant comprises applying the electromagnetic effects (EME) protection sealant as a film (operation 906). In some illustrative examples, applying the electromagnetic effects (EME) protection sealant comprises brushing on the electromagnetic effects (EME) protection sealant (operation 908). In some illustrative examples, applying the electromagnetic effects (EME) protection sealant comprises spraying on the electromagnetic effects (EME) protection sealant (operation 910). In some illustrative examples, applying an electromagnetic effects (EME) protection sealant to a number of portions of the blind fastener comprises applying the electromagnetic effects (EME) protection sealant to a fay surface of the blind fastener (operation 909).

In some illustrative examples, the number of portions comprises at least one of a bulb forming portion of a sleeve or under a head of the blind fastener (operation 912). In some illustrative examples, electromagnetic effects (EME) protection sealant is applied to a bulb forming portion of a sleeve of the blind fastener. In some illustrative examples, electromagnetic effects (EME) protection sealant is applied to the bottom of the head of the blind fastener. In some illustrative examples, electromagnetic effects (EME) protection sealant is applied to both the bulb forming portion of the sleeve of the blind fastener and the bottom of the head of the blind fastener.

In some illustrative examples, installing the blind fastener forms a bulb against the composite structure (operation 914). When the driver moves towards the head of the fastener, the driver compresses the sleeve to form a bulb. In some illustrative examples, installing the blind fastener comprises forming a bulb against an inner mold line of a hole of the composite structure (operation 915). In some illustrative examples, installing the blind fastener presses the electromagnetic effects (EME) protection sealant between the blind fastener and the composite structure (operation 916). In some illustrative examples, forming the bulb compresses electromagnetic effects (EME) protection sealant on the bulb forming portion of the sleeve to the composite structure. In some illustrative examples, installing the blind fastener presses the electromagnetic effects (EME) protection sealant beneath the head of the blind fastener against the composite structure.

In some illustrative examples, installing the blind fastener comprises activating the electromagnetic effects (EME) protection sealant with friction generated heat (operation 918). In some illustrative examples, installing the blind fastener generates heat from the friction of turning the driver of the blind fastener. In some illustrative examples, the heat from the friction activates the electromagnetic effects (EME) protection sealant.

In some illustrative examples, activating the electromagnetic effects (EME) protection sealant with heat comprises activating the electromagnetic effects (EME) protection sealant with friction generated heat from friction between the blind fastener and the composite structure (operation 920).

Figure 10:
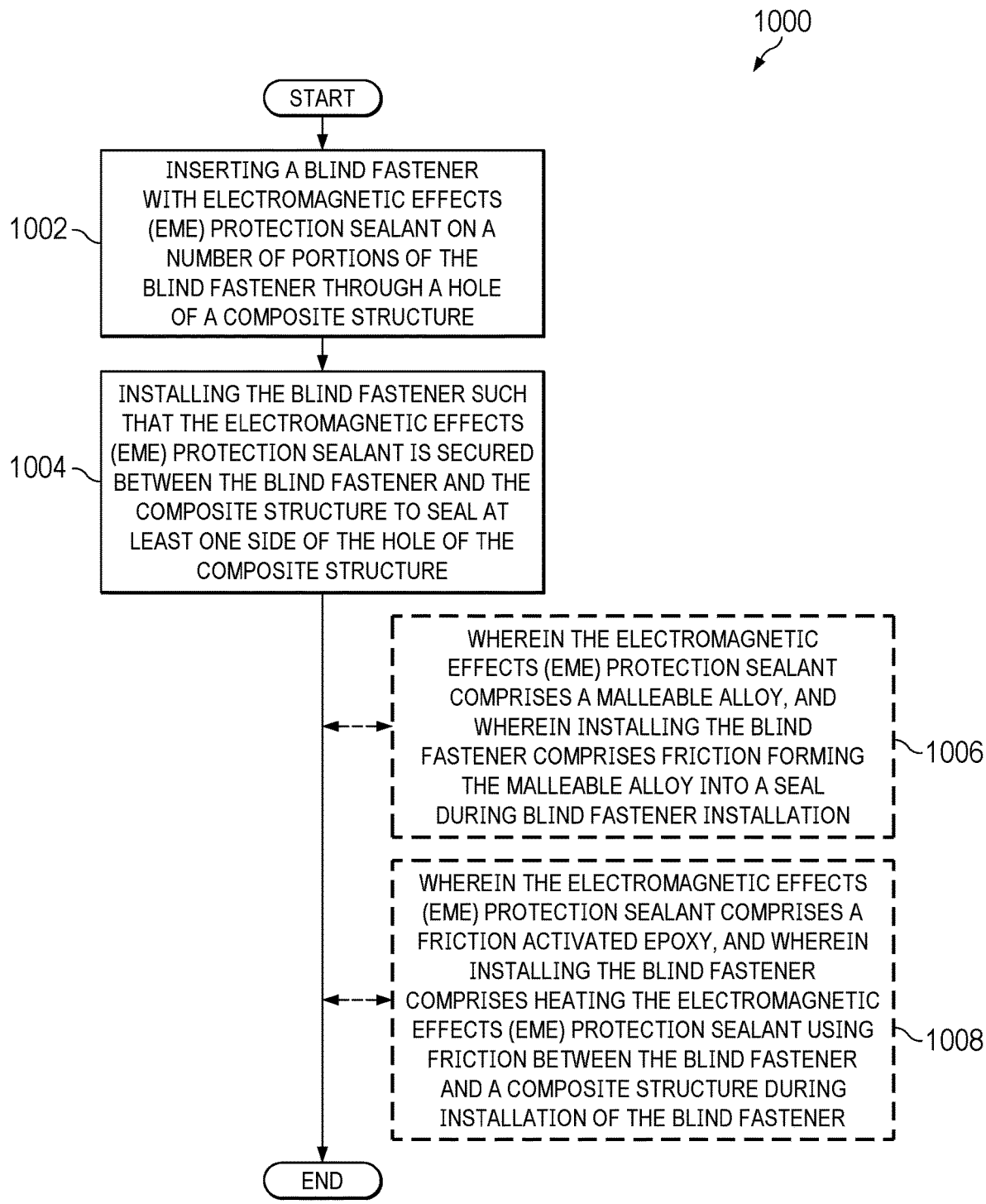
FIG. 10 is a flowchart of a method of forming a liquid-tight seal during blind fastener installation in accordance with an illustrative embodiment.

Turning now to FIG. 10, a flowchart of a method of providing electromagnetic effects protection to a composite structure is depicted in accordance with an illustrative embodiment. Method 1000 can be used to apply electromagnetic effects (EME) protection sealant 310 to blind fastener 300. Method 1000 can be used to install blind fastener 410 in composite structure 402. Method 1000 can be used to apply electromagnetic effects (EME) protection sealant 510 to blind fastener 500. Method 1000 can be used to install blind fastener 610 in composite structure 602. Method 1000 can be used to apply electromagnetic effects (EME) protection sealant 710 and electromagnetic effects (EME) protection sealant 714 to blind fastener 700. Method 1000 can be used to install blind fastener 810 in composite structure 802.

Method 1000 inserts a blind fastener with electromagnetic effects (EME) protection sealant on a number of portions of the blind fastener through a hole of a composite structure (operation 1002). Method 1000 installs the blind fastener such that the electromagnetic effects (EME) protection sealant is secured between the blind fastener and the composite structure to seal at least one side of the hole of the composite structure (operation 1004). Afterwards, method 1000 terminates.

In some illustrative examples, the electromagnetic effects (EME) protection sealant comprises a malleable alloy, and wherein installing the blind fastener comprises friction forming the malleable alloy into a seal during blind fastener installation (operation 1006). In some illustrative examples, the electromagnetic effects (EME) protection sealant comprises a friction activated epoxy, and wherein installing the blind fastener comprises heating the electromagnetic effects (EME) protection sealant using friction between the blind fastener and a composite structure during installation of the blind fastener (operation 1008).

Figure 11:
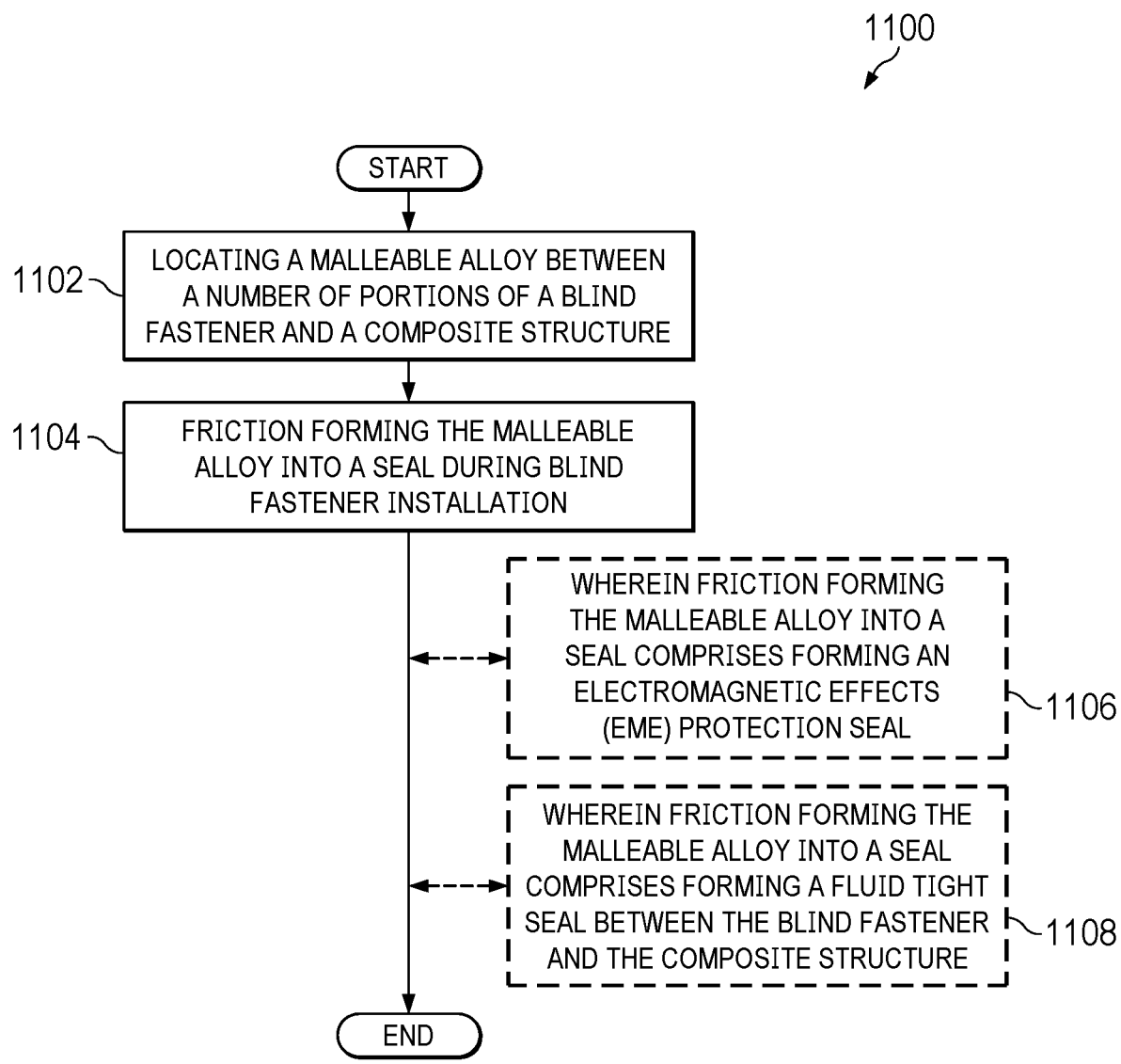
FIG. 11 is a flowchart of a method of providing electromagnetic effects protection to a composite structure in accordance with an illustrative embodiment.

Turning now to FIG. 11, a flowchart of a method of providing electromagnetic effects protection to a composite structure is depicted in accordance with an illustrative embodiment. Method 1100 can be used to apply electromagnetic effects (EME) protection sealant 310 to blind fastener 300. Method 1100 can be used to install blind fastener 410 in composite structure 402. Method 1100 can be used to apply electromagnetic effects (EME) protection sealant 510 to blind fastener 500. Method 1100 can be used to install blind fastener 610 in composite structure 602. Method 1100 can be used to apply electromagnetic effects (EME) protection sealant 710 and electromagnetic effects (EME) protection sealant 714 to blind fastener 700. Method 1100 can be used to install blind fastener 810 in composite structure 802.

Method 1100 locates a malleable alloy between a number of portions of a blind fastener and a composite structure (operation 1102). Method 1100 friction forms the malleable alloy into a seal during blind fastener installation (operation 1104). Afterwards, method 1100 terminates.

In some illustrative examples, friction forming the malleable alloy into a seal comprises forming an electromagnetic effects (EME) protection seal (operation 1106). In some illustrative examples, friction forming the malleable alloy into a seal comprises forming a fluid tight seal between the blind fastener and the composite structure (operation 1108).

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 906 through operation 920 may be optional. As another example, operation 1006 through operation 1008 may be optional.

Figure 12:
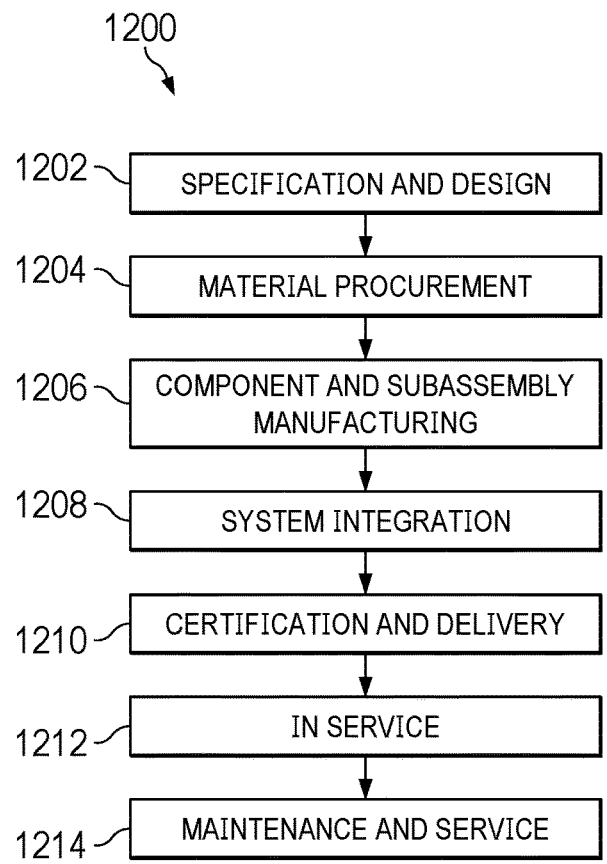
FIG. 12 is an illustration of an aircraft manufacturing and service method in a form of a block diagram in accordance with an illustrative embodiment.
Figure 13:
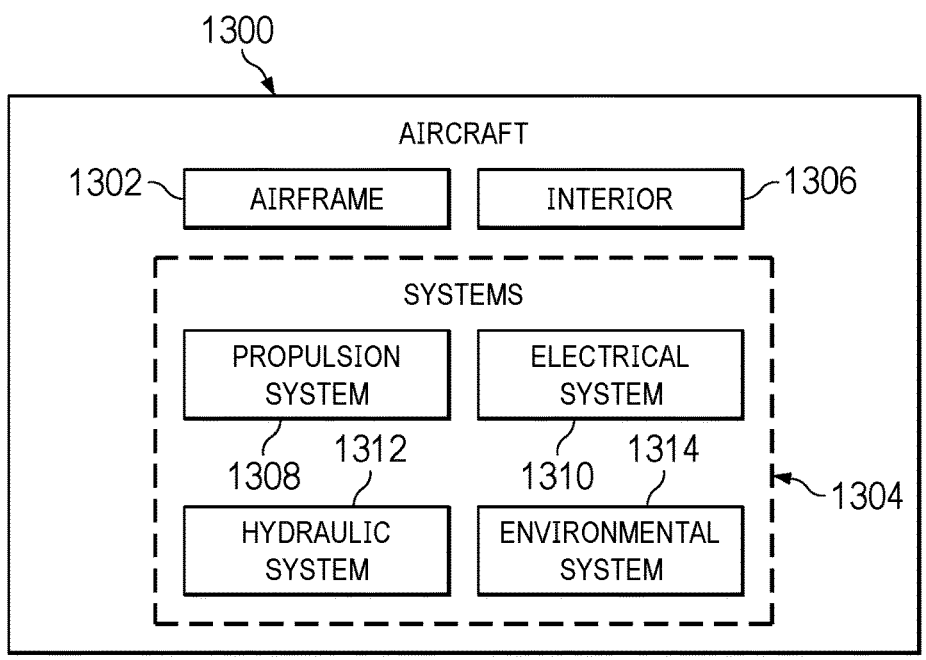
FIG. 13 is an illustration of an aircraft in a form of a block diagram in which an illustrative embodiment may be implemented.

Illustrative embodiments of the present disclosure may be described in the context of aircraft manufacturing and service method 1200 as shown in FIG. 12 and aircraft 1300 as shown in FIG. 13. Turning first to FIG. 12, an illustration of an aircraft manufacturing and service method in a form of a block diagram is depicted in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 takes place. Thereafter, aircraft 1300 may go through certification and delivery 1210 in order to be placed in service 1212. While in service 1212 by a customer, aircraft 1300 is scheduled for routine maintenance and service 1214, which may include modification, reconfiguration, refurbishment, or other maintenance and service.

Each of the processes of aircraft manufacturing and service method 1200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of an aircraft in a form of a block diagram is depicted in which an illustrative embodiment may be implemented. In this example, aircraft 1300 is produced by aircraft manufacturing and service method 1200 of FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included.

Apparatuses and methods embodied herein may be employed during at least one of the stages of aircraft manufacturing and service method 1200. One or more illustrative embodiments may be manufactured or used during at least one of component and subassembly manufacturing 1206, system integration 1208, in service 1212, or maintenance and service 1214 of FIG. 12.

The illustrative examples provide a method that can be utilized to apply electromagnetic effects (EME) protection sealant to one-sided blind fasteners. The method can be utilized with conventionally used one-sided fasteners already in production use.

In one illustrative example, electromagnetic effects (EME) protection sealant can be applied under the countersink of the fastener. In one illustrative example, electromagnetic effects (EME) protection sealant can be present on a malleable portion of the shank. The malleable portion of the shank is a portion of the shank configured to form a bulb during installation. In some illustrative examples, electromagnetic effects (EME) protection sealant can be present in both locations.

In some illustrative examples, electromagnetic effects (EME) protection sealant can be formed from a two-part epoxy. In some illustrative examples, electromagnetic effects (EME) protection sealant is a singular adhesive.

In some illustrative examples, the fastener is sealed against fluid leakage in two locations. The seal on both ends can prevent expanded gases produced by a lightning strike from escaping from either end until the area cools down. The seal on both ends can prevent fluid leakage through the fastener.

In some illustrative examples, the electromagnetic effects (EME) protection sealant can be a rubber type of epoxy that is an insulating material. In some illustrative examples, the rubber type of epoxy is an insulating material to stop fluid from escaping from the fuel tank through the body of the fastener.

In some illustrative examples, the electromagnetic effects (EME) protection sealant is a low melting, malleable alloy that forms to the edge of the hole under the sleeve during installation. In some of these illustrative examples, the malleable alloy is conductive, such as a conductive coating finish. In these illustrative example, the malleable alloy rubs against the hole. By rubbing against the composite structure during installation, the conductive material can be smashed into voids in the composite material. When this occurs, the conductive malleable alloy for electromagnetic effects (EME) protection sealant increases the conductivity for EME. In these illustrative examples, additional conductive gap filler for the joint can be reduced or eliminated.

The electromagnetic effects (EME) protection sealant can be a two-piece epoxy where Part A and B mix during installation due to the heat activation. In some illustrative examples the two-piece epoxy can act like a glue. In some illustrative examples, the two-piece epoxy can be a sealant material.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A blind fastener that comprises:
   a sleeve that comprises a bulb forming portion and a head; and
   an electromagnetic effects (EME) protection sealant positioned on at least one of the bulb forming portion of the sleeve or under the head.

2. The blind fastener of claim 1, wherein the electromagnetic effects (EME) protection sealant comprises a malleable alloy.

3. The blind fastener of claim 1, wherein the electromagnetic effects (EME) protection sealant comprises an insulating epoxy.

4. The blind fastener of claim 3, wherein the insulating epoxy comprises a rubber.

5. The blind fastener of claim 1, wherein the electromagnetic effects (EME) protection sealant comprises a two-part epoxy.

6. The blind fastener of claim 1, wherein the electromagnetic effects (EME) protection sealant is heat activated.

7. The blind fastener of claim 1, wherein the electromagnetic effects (EME) protection sealant is non-conductive.

8. The blind fastener of claim 1, wherein the electromagnetic effects (EME) protection sealant is a film.

9. The blind fastener of claim 1, wherein the electromagnetic effects (EME) protection sealant is configured to seal against aircraft fuel.

10. A method of providing electromagnetic effects protection to a composite structure, the method comprising:
    applying an electromagnetic effects (EME) protection sealant on at least one of a bulb forming portion of a sleeve or under a head of a blind fastener; and
    installing the blind fastener with the electromagnetic effects (EME) protection sealant into the composite structure such that the electromagnetic effects (EME) protection sealant is between the blind fastener and the composite structure.

11. The method of claim 10, further comprising applying the electromagnetic effects (EME) protection sealant the bulb forming portion of the sleeve and under the head of the blind fastener.

12. The method of claim 10, wherein installing the blind fastener forms a bulb against the composite structure.

13. The method of claim 10, wherein installing the blind fastener comprises forming a bulb against an inner mold line of a hole of the composite structure.

14. The method of claim 10, wherein installing the blind fastener presses the electromagnetic effects (EME) protection sealant between the blind fastener and the composite structure.

15. The method of claim 10, wherein applying the electromagnetic effects (EME) protection sealant comprises applying the electromagnetic effects (EME) protection sealant as a film.

16. The method of claim 10, wherein applying the electromagnetic effects (EME) protection sealant comprises brushing on the electromagnetic effects (EME) protection sealant.

17. The method of claim 10, wherein applying the electromagnetic effects (EME) protection sealant comprises spraying on the electromagnetic effects (EME) protection sealant.

18. The method of claim 10, wherein installing the blind fastener comprises activating the electromagnetic effects (EME) protection sealant with heat.

19. The method of claim 18, wherein activating the electromagnetic effects (EME) protection sealant with heat comprises activating the electromagnetic effects (EME) protection sealant with friction generated heat from friction between the blind fastener and the composite structure.

20. The method of claim 10, wherein applying an electromagnetic effects (EME) protection sealant to a number of portions of the blind fastener comprises applying the electromagnetic effects (EME) protection sealant to a fay surface of the blind fastener.

21. A composite structure that comprises:
a first composite component;
a second composite component;
a blind fastener installed through a hole in the first composite component and the second composite component; and
an electromagnetic effects (EME) protection sealant positioned at least one of between a bulb of the blind fastener and the second composite component or between a head of the blind fastener and the first composite component.

22. The composite structure of claim 21, wherein the electromagnetic effects (EME) protection sealant forms a fluid tight seal between at least one of the first composite component or the second composite component and the blind fastener.

23. The composite structure of claim 21, wherein a remainder of a shank of the blind fastener is free of the electromagnetic effects (EME) protection sealant.

24. A method of forming a liquid-tight seal during blind fastener installation comprising:
inserting a blind fastener with electromagnetic effects (EME) protection sealant on at least one of a bulb forming portion of a sleeve or under a head of the blind fastener through a hole of a composite structure; and
installing the blind fastener such that the electromagnetic effects (EME) protection sealant is secured between the blind fastener and the composite structure to seal at least one side of the hole of the composite structure.

25. A method of forming an alloy seal during blind fastener installation comprising:
locating a malleable alloy between a number of portions of a blind fastener and a composite structure; and
friction forming the malleable alloy into a seal placed on at least one of a bulb forming portion of a sleeve or under a head of the blind fastener during blind fastener installation wherein friction forming the malleable alloy into a seal comprises forming an electromagnetic effects (EME) protection seal.

* * * * *